United States Patent [19]
Linder

[11] 3,907,245
[45] Sept. 23, 1975

[54] PLASTIC, TWO PIECE CANDLE MOLD WITH INTEGRAL FASTENING MEANS

[75] Inventor: Joseph Linder, Cincinnati, Ohio

[73] Assignee: Fibre Glass-Evercoat Co., Inc., Cincinnati, Ohio

[22] Filed: June 10, 1974

[21] Appl. No.: 477,693

Related U.S. Application Data

[63] Continuation of Ser. No. 284,640, Aug. 29, 1972, abandoned.

[52] U.S. Cl. ............... 249/94; 249/96; 249/168; 425/803
[51] Int. Cl.² ........................................ B29C 1/00
[58] Field of Search.... 425/803, DIG. 44, DIG. 124; 249/55, 105, 134, 139, 140, 160, 164, 168, 96, 95, 94

[56] References Cited
UNITED STATES PATENTS

| 2,687,157 | 8/1954 | Cowan | 150/46 |
|---|---|---|---|
| 3,309,738 | 3/1967 | Friedman | 249/139 |
| 3,332,658 | 7/1967 | Lemelson | 249/139 |
| 3,721,419 | 3/1973 | Bolinger | 425/803 |
| 3,788,590 | 1/1974 | Hasselbach | 425/803 |
| 3,799,492 | 3/1974 | O'Laughlin | 425/803 |

FOREIGN PATENTS OR APPLICATIONS

| 602,263 | 2/1960 | Italy | 249/55 |
|---|---|---|---|

*Primary Examiner*—Robert D. Baldwin
*Assistant Examiner*—John McQuade
*Attorney, Agent, or Firm*—J. Warren Kinney, Jr.

[57] ABSTRACT

The invention is directed to a bipart mold to produce castings of wax, plaster, gelatines, and various other plastics or moldable materials which may be poured into the mold in the fluid state, and removed from the mold after setting or solidifying. The improved bipart mold is formed of a plastic material having a degree of inherent flexibility and resiliency such as to permit forming thereon a plurality of integral, manipulatable mold locks or latches for locking the mold sections together with ease and despatch, the entire locking means being inseparable from, that is, integral with the mold parts or sections.

25 Claims, 9 Drawing Figures

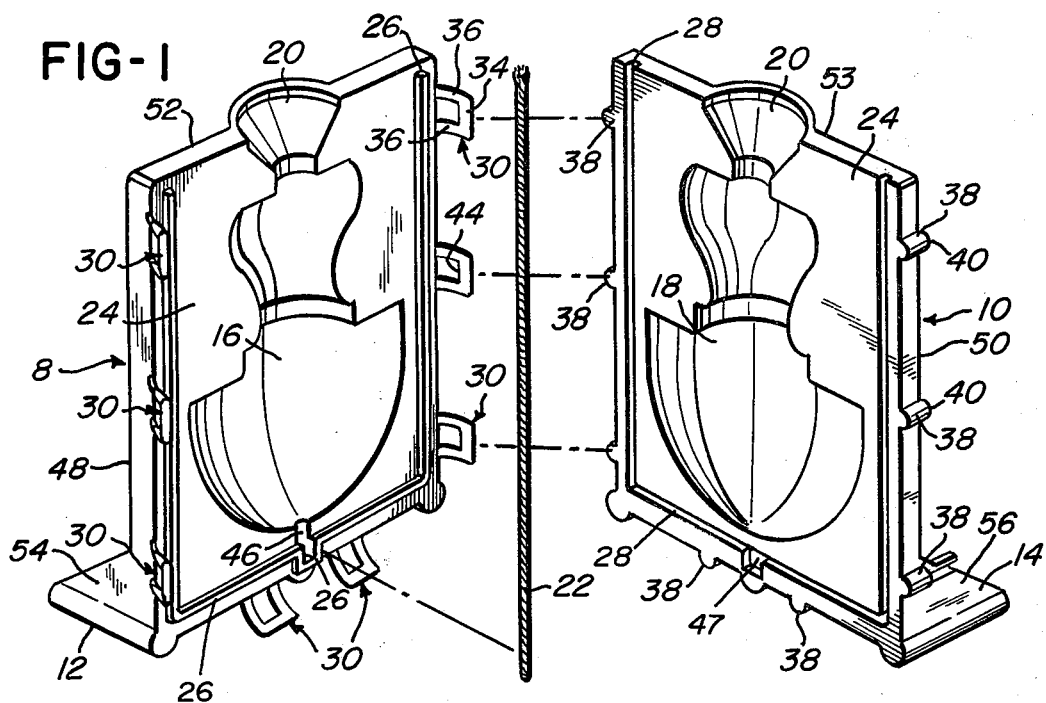
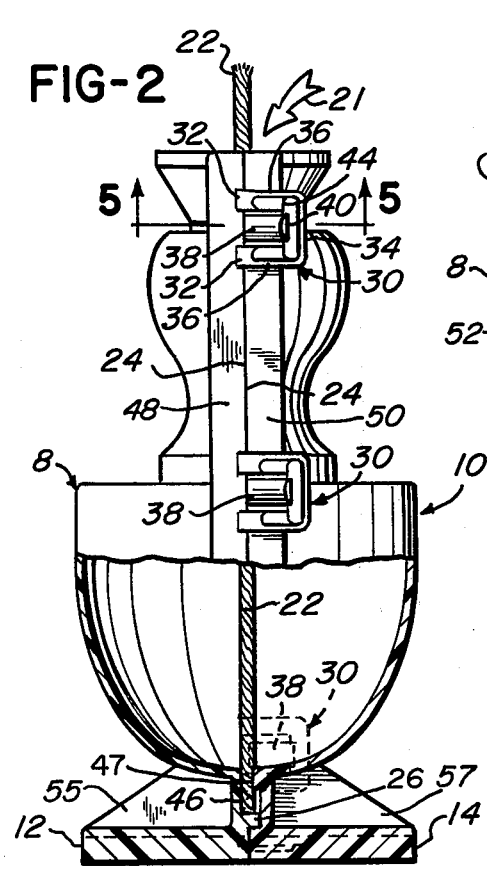
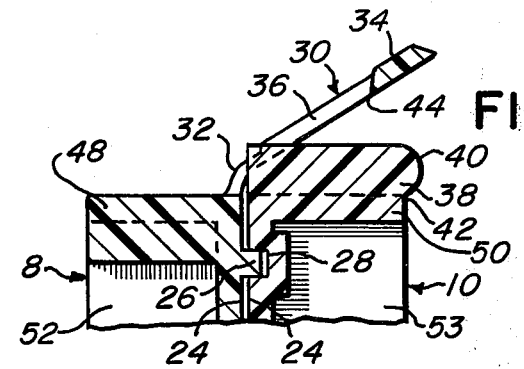
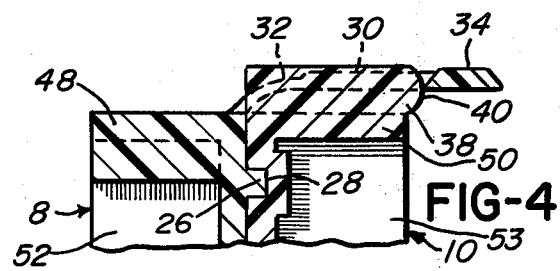
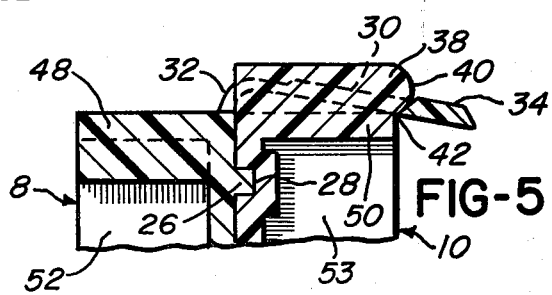

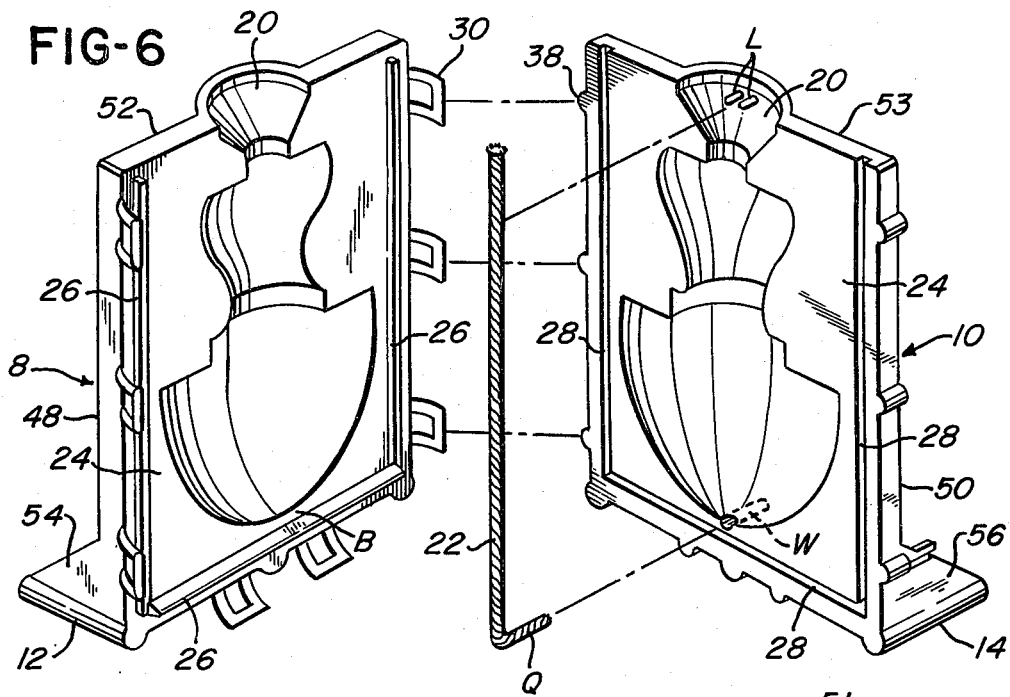
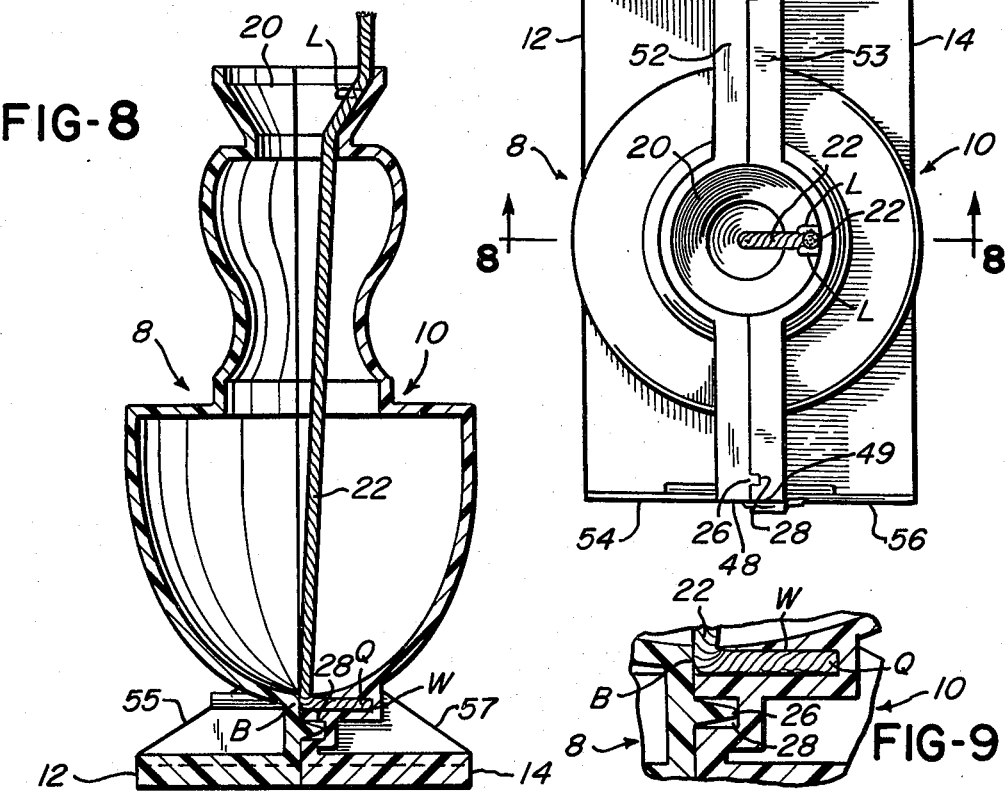
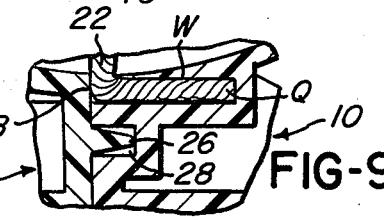

ns with ma hi mu ra
PLASTIC, TWO PIECE CANDLE MOLD WITH INTEGRAL FASTENING MEANS This is a continuation of application Ser. No. 284,640 filed Aug. 29, 1972, now abandoned.

BACKGROUND OF THE INVENTION

Sectional molds in general have been constructed of metal or other relatively rigid or inflexible material, which by its nature required the employment of special clamps or locking devices, manufactured as separate elements, and attached to or attachable to the mold sections. The attachable type of mold clamp, being separate from the mold section, was often lost or mislaid, or due to its small size it was difficult to manipulate while closing the mold. In the case of the permanently attached clamp, there was involved the labor and expense of assembly, which added to the cost of the mold.

DESCRIPTION OF THE PRIOR ART

The prior art is disclosed in U.S. Pat. No. 3,393,890 which utilizes separate clamps 50, and in U.S. Pat. No. 1,168,433 which utilizes pivoted clamps 10. Another U.S. patent, Forbes U.S. Pat. No. 2,218,260, is cited for the purpose of showing a mold constructed of flexible material which, however, fails to include the instant improvement involving mold locks or latches that are integral with and inseparable from the mold sections.

SUMMARY OF THE INVENTION

In accordance with the present invention, the mold sections are formed of a moldable material, which in the manufacture of the sections incorporates integral flexible loops on one section to be manually engaged and disengaged with respect to a series of cooperative hooked lugs or knobs on the other section of the mold. The hooked lugs or knobs, and the loops, are inexpensively formed on the mold sections incident to fabrication of the sections by a thermoplastic molding process.

To lock up the mold for pouring, the flexible loops are quickly and easily snapped over the hooked lugs in a single operation by the fingers of the worker; and the mold is just as easily and quickly unlocked for release of the molded contents. The loops are slightly constricted in size, and have flexible knife-edged interior lips which induce snap-action engagement of the mold locks or latches. The mold preferably includes a base, and is self-standing thereon.

The invention is herein disclosed as applied to a mold for producing decorative or fancy candles having a central wick, but this disclosure is to be considered exemplary only, since the mold quite obviously might be variously contoured to produce molded articles other than candles.

BRIEF DESCRIPTION OF THE DRAWING

FIG. 1 is an exploded view of the bipart mold incorporating the locking means of the present invention.

FIG. 2 is an edge elevational view of the mold fully assembled and locked up, portions being shown in cross-section, and with a candle wick in place preparatory to pouring with fluid wax or other solidifiable substance.

FIGS. 3, 4 and 5 are enlarged cross-sections taken on line 5—5 of FIG. 2, and showing the mold locking means in various phases of engagement and disengagement.

FIG. 6 illustrates a modification of FIG. 1.

FIG. 7 is a top plan view of the mold of FIG. 6, in fully assembled, locked up condition.

FIG. 8 is a sectional view on line 8—8 of FIG. 7.

FIG. 9 is an enlarged fragmental cross-section of a portion of the lower part of FIG. 8.

DESCRIPTION OF THE PREFERRED EMBODIMENT

In the drawings, the bipart mold is seen to comprise the cooperative mold parts or sections 8 and 10, each having a top end, a bottom end and opposite sides, and including integral base portions 12 and 14 on the bottom end which serve to support the assembled mold in upright condition, FIG. 2. The mold sections have cavities 16 and 18 contoured to produce a desired molded article or casting after closing and pouring of the mold and as shown, the cavities 16 and 18 are substantially identical. A gate portion 20 at the top of each mold cavity serves to permit filling of the mold with a suitable molding substance which enters the mold as a fluid at arrow 21, and eventually solidifies therein. The solidified article or casting is released by parting the mold sections, FIG. 1.

The molding substance may be a wax, a plaster, a gelatin, a comestible, or other substance capable of being molded and solidified either at room temperature or at freezing temperatures. In the example illustrated, a candle wick 22 is supported within the mold to produce a wax candle.

Each of the mold sections is a molded thermoplastic thinwalled body cast in a single piece, and in which the mold cavity, the base, and the gate portion are integral with a substantially planar portion 24 surrounding the cavity and disposed at approximate right angles to the base. The planar portions 24, 24 constitute the mold parting, and will flatly contact one another when the mold is assembled according to FIG. 2. Due to the thin wall construction of the mold sections, the approximate shape of the molded article may be determined by observing the outside of the mold.

The cavities of the mold sections are placed and maintained in accurate registry, by alignment means formed integrally upon the sections, and constituted preferably of interfitting tongues or ribs and grooves or channels carried by the planar portions of the mold sections. The tongue, denoted 26, embraces or surrounds the mold cavity 16 along the bottom and opposite sides thereof, and is dimensioned to enter and fit nicely into the complementary groove 28 disposed about the cavity 18 of section 10. The tongue 26 and groove 28 extend substantially continuously along the sides and bottoms of the planar portions 24, 24, to ensure extreme accuracy in registration of the mold cavities, and to provide an effective sealing means insuring against possible leakage of fluid material from the mold cavities prior to setting or congealing. It is unnecessary, of course, to extend the tongue and groove structure along the horizontal top margins of the mold sections.

The means provided for locking up the mold, with its cavities and gate portions in registry, may comprise a series of simple clamp elements formed integrally with fabrication of the mold sections. Such clamp elements may include flexible closed loops 30 formed of the semi-rigid thermoplastic material of the mold section 8, the loops being formed initially in the plane of planar portion 24 outwardly of the longitudinal sections of tongue 26. Due to an inherent limited flexibility of the mold material, the loops are capable of being bent manually at approximate right angles to planar portion 24 of mold section 8, repeatedly and casually, without damage to the loops.

Flexibility and resiliency of the loops as required for ease of manipulation may be attained by reducing the thickness of the loop arms at 32 where the loops are hingedly supported by the mold section. The loops are considerably thicker outwardly beyond the hinge areas 32. Each loop is closed at its outer end by a transverse strut or fingerpiece 34 joining the loop arms 36, 36.

Loops 30 are adapted for snap-action latching engagement and disengagement relative to a series of hooked lugs or knobs 38 formed integrally on mold section 10. The lugs or knobs are equal in number to the number of loops 30, and are so located as to be embraceable by the loops after closing of the mold sections upon one another, FIGS. 2–5.

Each lug or knob 38 has a dome or protuberance 40 at that end thereof which is remote from planar surface 24, to provide a recess or seat 42 where the protuberance meets the body of mold section 10. The seat or recess 42 in every instance is closer to the planar parting surface 24 than is the apex of the dome or protuberance 40. Accordingly, when the loop is manually moved from the position of FIG. 3 to that of FIG. 5, strut 34 thereof will first override dome 40 with considerable frictional resistance, then will advance to the fully engaged position at recess 42 with a snap action induced by the inherent yieldability and the restricted length of the loop.

To enhance the snap action engagement and disengagement of the latch as above explained, the strut or fingerpiece 34 of each loop 30 may be provided with an interior incline or knife edge 44. The incline assists in urging the loop strut to the off-center seated position of FIG. 5, after the strut advances past the dead-center position of FIG. 4. As will be understood from the foregoing explanation, each loop 30 is subject to limited resilient stretchability in the direction of its length, due to the inherent flexibility and resiliency of the plastic material of which it is formed, and the reduction in thickness at hinge 32. FIG. 4 shows loop 30 stretched to its maximum extent in practice.

To effect parting of the mold for release of its molded object, the operator will simply displace all of the loops 30 from the FIG. 5 position to the position of FIG. 3. The loops will be found very durable to withstand many actuations throughout the life of the mold. When using the mold to produce candles, mold section 8 is provided with a recess 46 to accommodate, position and securely clamp one end of a wick 22 against surface 47 of mold section 10. The interlocking relationship of tongue portion 26 in the grooved portion 28 provides a positive leak-proof seal along the sides and bottom of the mold sections 8 and 10.

With reference to FIGS. 6–9, the modification illustrated therein differs from the disclosure of the device illustrated in FIGS. 1 and 2, primarily in the manner in which the wick is secured relative to the mold sections preparatory to charging or filling of the mold.

As best illustrated in FIGS. 6, 8 and 9, one of the mold parts or sections 10 of the particular illustration is provided with a transverse bore or socket W for the reception of end Q of wick 22. The other end of the wick is adapted to be inserted between a pair of outwardly projecting, laterally spaced clamp fingers L disposed adjacent the gate portion 20 of mold section 10. The clamp fingers are so spaced apart as to detachably retain the wick end while the mold undergoes charging. The fingers are adapted to release the wick incident to stripping of the mold from the molded object.

The lowermost end of wick 22 is securely positioned and locked within the mold by engagement of clamp area B of planar portion 24 of the other mold part or section, with the wick at the entrance of socket W. Upon parting of the mold, wick end Q will readily withdraw from the socket.

With the mold sections interlocked as illustrated in FIGS. 7 and 8, a suitable molding substance introduced through gate portion 20 will fill the mold, and accidental or unintentional leakage or bleeding of the molding substance from the interior of the mold will be effectively prevented.

The mold sections 8 and 10 have integral reinforcing flanges 48, 49 and 50, 51 along their opposite edges, respectively, and similar integral reinforcing flanges 52 and 53 along their top edges, respectively, to reinforce and rigidify the mold, and on the outer surfaces of which the clamping means 30 and 38 are integrally formed. Triangular shaped bracing webs or gussets 54, 55 and 56, 57 are integrally joined with the flanges or bases 12 and 14 on the bottom end or edge and the side reinforcing flanges of the mold sections 8 and 10, respectively.

What is claimed is:

1. A bipart mold for producing molded objects from a fluid molding material such as wax, plaster, gelatin and the like which is settable to a solid condition; said mold comprising two registerable, separable, plastic, one-piece mold sections having mating registerable mold cavities therein which define a single enclosed mold cavity when the sections are operatively assembled together, said mold sections having a filling gate in communication with the mold cavity; a marginal, substantially planar portion on each mold section at the top, bottom and sides of the cavity and defining a mold parting area having substantially flat peripheral edges, means on said planar portions for aligning and sealing the mold sections relative to one another when the sections are operatively assembled; a plurality of spaced apart, registerable, interengageable, cooperative, integral mold clamping means on the peripheral edges of said sections for releasably holding the mold sections in substantial mutual contact at said parting areas, and said mold sections each having integral enlarged base portions thereon for supporting the mold in upright position to enable filling of the mold cavity through the filling gate when the mold sections are held in operative assembled relationship by said clamping means.

2. The mold as defined by claim 1, wherein interfitting, separable tongue and groove connectors are on said marginal portions of said mold sections to maintain the mold sections in mating registry with one another, said tongue and groove connectors being continuous along the major portions of the mold section margins.

3. The mold as defined by claim 2, wherein the tongue and groove connectors extend parallel to and closely adjacent the marginal edges of the bottom and opposite sides of the mold sections.

4. The mold as defined in claim 1, wherein the mold cavity has an outer shape approximating the shape of the article to be molded therein.

5. The mold as defined in claim 1, wherein the mold sections are generally rectangularly shaped and have integral, peripherally extending reinforcing flanges on the marginal edges thereof.

6. The mold as defined in claim 5, wherein the clamping means includes a plurality of spaced apart flexible loops on the outer surface of the reinforcing flanges of one of the mold sections and a plurality of integral lugs on the outer surface of the flanges of the other mold section.

7. The mold as defined in claim 5, wherein the base portions and reinforcing flanges on the mold sections project perpendicularly away from the mold parting area, and the base portions are of greater width than the flanges.

8. The mold as defined by claim 1, wherein the clamping means include loops initially formed substantially coplanar with the planar portion of one of the mold sections.

9. The mold as defined by claim 8, wherein said loops are integral with said one mold section and are resiliently stretchable relative thereto.

10. The mold as defined by claim 8, wherein in addition to said loops, the clamping means include lugs formed integrally upon the remaining mold section in position to be engaged by said loops.

11. The mold as defined by claim 10, wherein the loops and lugs include snap action means for snap engagement of the lugs by the loops aforesaid.

12. The mold as defined by claim 11, wherein said snap action means comprises a transverse strut on each loop, an extended dome on each lug, and a seat adjacent to each lug dome, the loop in advancing over the lug being subject to stretch as the strut traverses the dome with a frictional engagement and finds a position of repose upon said seat.

13. The mold as defined by claim 12, wherein said dome has an apex located at a greater distance from the parting area of the lug-bearing mold section, than is the distance between said parting area and said seat.

14. The mold as defined by claim 12, wherein said transverse strut has an inclined surface approximately complementary as to angularity, to the angle of inclination of the dome at the seat side of the dome.

15. The mold as defined by claim 14, wherein said inclined surface terminates in a resilient knife edge on the strut in position to frictionally traverse the apex of the dome.

16. The mold as defined by claim 13, wherein said transverse strut has an inclined surface angled approximately complementarily to the angle of inclination of the dome at the seat side of the dome axis.

17. The mold as defined by claim 16, wherein said inclined surface terminates in a resilient knife edge on the strut in position to frictionally wipe the apex of the dome prior to assuming a position of rest upon the seat aforesaid.

18. The mold as defined by claim 17, wherein the mold sections are maintained in registry by interfitting separable tongue and groove connectors, said connectors being substantially continuous along the major portions of the mold section margins.

19. The mold as defined by claim 1, wherein is included means for releasably holding opposite end portions of a wick in position to span the cavity of the mold when assembled.

20. The mold as defined by claim 19, wherein the means last mentioned comprises a wick socket near one end of the cavity, and a wick clamp means near the opposite end thereof.

21. The mold as defined by claim 20, wherein is included means to clamp the wick at said socket incident to closing of the mold.

22. The mold as defined by claim 19, wherein said wick holding means comprises a pair of spaced clamp fingers carried by one of the mold sections.

23. The mold as defined by claim 18, wherein is included means for releasably holding opposite end portions of a wick in position to span the cavity of the mold when assembled.

24. A mold as in claim 1, wherein at least one of said mold sections has a socket therein at one end of the mold cavity for receiving one end of a wick; and wick receiving and holding means at the other end of the mold cavity for holding the other end of a wick to maintain said wick in substantially centered relationship across said mold cavity.

25. A mold as in claim 2, wherein at least one of said mold sections has a socket therein at one end of the mold cavity for receiving one end of a wick; and wick receiving and holding means at the other end of the mold cavity for holding the other end of a wick to maintain said wick in substantially centered relationship across said mold cavity.

* * * * *